(12) United States Patent
Backhouse et al.

(10) Patent No.: US 12,084,987 B2
(45) Date of Patent: Sep. 10, 2024

(54) STATOR VANE RING AND A METHOD OF MANUFACTURE

(71) Applicant: ROLLS-ROYCE plc, London (GB)

(72) Inventors: Robert C. Backhouse, Wells (GB); Christopher D. Jones, Bristol (GB)

(73) Assignee: Rolls-Royce plc

( * ) Notice: Subject to any disclaimer, the term of this patent is extended or adjusted under 35 U.S.C. 154(b) by 76 days.

(21) Appl. No.: 17/021,396

(22) Filed: Sep. 15, 2020

(65) Prior Publication Data
US 2021/0164352 A1 Jun. 3, 2021

(30) Foreign Application Priority Data
Sep. 17, 2019 (GB) .................................. 1913392

(51) Int. Cl.
*F01D 5/28* (2006.01)
*B29B 11/16* (2006.01)
(Continued)

(52) U.S. Cl.
CPC .............. *F01D 5/282* (2013.01); *B29B 11/16* (2013.01); *B29C 70/86* (2013.01); *F01D 5/18* (2013.01);
(Continued)

(58) Field of Classification Search
CPC .......... B29C 70/86; B29C 53/60; B29C 53/82
(Continued)

(56) References Cited

U.S. PATENT DOCUMENTS

| 3,532,438 A | 10/1970 | Palfreyman et al. |
| 3,551,237 A * | 12/1970 | Cox ................... B29C 53/824 52/693 |
| 5,686,038 A | 11/1997 | Christensen et al. |

(Continued)

FOREIGN PATENT DOCUMENTS

| CN | 110341212 | 10/2019 |
| EP | 0446851 | 9/1991 |

(Continued)

OTHER PUBLICATIONS

European search report dated Jan. 22, 2021, issued in EP Patent Application No. EP20192320.
(Continued)

*Primary Examiner* — Michael A Tolin
*Assistant Examiner* — Hana C Page
(74) *Attorney, Agent, or Firm* — Barnes & Thornburg LLP

(57) ABSTRACT

Method of manufacturing an integral thermoset infused fibre reinforced composite, structural stator vane ring for a core inlet, a bypass duct, or an air intake of a gas turbine engine. The method comprises winding fibre reinforcement material around a mandrel to form an inner annulus preform; providing a plurality of vane preforms comprising fibre reinforcement material, arranging the plurality of vane preforms around the inner annulus preform, and connecting each of the plurality of vane preforms to the inner annulus preform using a fibre jointing method; winding fibre reinforcement material around the plurality of vane preforms to form an outer annulus preform and connecting the outer annulus preform to each of the plurality of vane preforms using a fibre jointing method to produce a stator vane ring preform; and infusing a thermoset resin into the stator vane ring preform and curing the resin to form the integral stator vane ring.

16 Claims, 7 Drawing Sheets

(51) Int. Cl.
  *B29C 53/60*  (2006.01)
  *B29C 70/86*  (2006.01)
  *F01D 5/18*   (2006.01)
  *F02C 7/04*   (2006.01)

(52) U.S. Cl.
  CPC ............... *B29C 53/60* (2013.01); *F02C 7/04* (2013.01); *F05D 2300/603* (2013.01)

(58) Field of Classification Search
  USPC ........................................................ 264/257
  See application file for complete search history.

(56) References Cited

U.S. PATENT DOCUMENTS

| | | | |
|---|---|---|---|
| 6,196,794 B1* | 3/2001 | Matsumoto | B29C 66/543 |
| | | | 416/241 A |
| 6,413,074 B1 | 7/2002 | Hays | |
| 8,109,734 B2* | 2/2012 | Backhouse | F01D 5/282 |
| | | | 442/205 |
| 10,751,958 B2* | 8/2020 | Kray | F01D 25/162 |
| 2009/0014926 A1 | 1/2009 | Marini | |
| 2010/0322763 A1 | 12/2010 | Penalver Castro et al. | |
| 2013/0156594 A1* | 6/2013 | Kray | F01D 5/34 |
| | | | 264/258 |
| 2015/0226071 A1 | 8/2015 | Marshall et al. | |
| 2015/0354597 A1 | 12/2015 | I | |
| 2016/0245103 A1 | 8/2016 | Gimat et al. | |
| 2017/0361512 A1* | 12/2017 | Plante | B29C 45/0005 |
| 2018/0163552 A1 | 6/2018 | Reynolds et al. | |
| 2020/0070385 A1* | 3/2020 | Sekine | B29C 70/543 |

FOREIGN PATENT DOCUMENTS

| | | |
|---|---|---|
| EP | 1215183 | 6/2002 |
| EP | 2105579 A2 | 9/2009 |
| EP | 2572825 | 3/2013 |
| EP | 2706240 | 3/2014 |
| EP | 3081760 A1 | 10/2016 |
| EP | 3564498 | 6/2019 |
| GB | 1170592 | 11/1969 |
| JP | 201199346 | 5/2011 |
| JP | 2017207016 A | 11/2017 |
| WO | 2010130879 | 11/2010 |
| WO | 2012153039 A1 | 11/2012 |
| WO | 2013133875 | 9/2013 |
| WO | 2015041963 A1 | 3/2015 |

OTHER PUBLICATIONS

European search report dated Jan. 15, 2021, issued in EP Patent Application No. EP20192316.
European search report dated Jan. 19, 2021, issued in EP Patent Application No. EP20192319.
Great Britain search report dated Feb. 27, 2020, issued in GB Patent Application No. 1913392.5.
Great Britain search report dated Mar. 5, 2020, issued in GB Patent Application No. 1913393.3.
Great Britain search report dated Feb. 19, 2020, issued in GB Patent Application No. 1913394.1.

* cited by examiner

STATOR VANE RING AND A METHOD OF MANUFACTURE

CROSS-REFERENCE TO RELATED APPLICATIONS

This specification is based upon and claims the benefit of priority from UK Patent Application Number 1913392.5 filed on 17 Sep. 2019, the entire contents of which are incorporated herein by reference.

BACKGROUND

Technical Field

The present invention relates to a structural, thermoset-infused fibre reinforced composite, integral stator vane ring for a core inlet, a bypass duct, or an air intake of a gas turbine engine, a method of manufacture thereof, a structural, thermoplastic-infused fibre reinforced composite, integral stator vane ring for a core inlet, a bypass duct, or an air intake of a gas turbine engine, and a method of manufacture thereof.

Description of the Related Art

Manufacturing of complex composite products, such as a stator vane ring for a gas turbine engine, typically involves laying up and consolidating component parts individually, and subsequently connecting component parts together by bolting. However, this increases the part count and manufacturing complexity for the complex product, such as the gas turbine engine, which increases costs during manufacturing.

SUMMARY

According to a first aspect, there is provided a method of manufacturing an integral thermoset infused fibre reinforced composite, structural stator vane ring for a core inlet, a bypass duct, or an air intake of a gas turbine engine, the method comprising: winding fibre reinforcement material around a mandrel to form an inner annulus preform; providing a plurality of vane preforms comprising fibre reinforcement material, arranging the plurality of vane preforms around the inner annulus preform, and connecting each of the plurality of vane preforms to the inner annulus preform using a fibre jointing method; winding fibre reinforcement material around the plurality of vane preforms to form an outer annulus preform and connecting the outer annulus preform to each of the plurality of vane preforms using a fibre jointing method to produce a stator vane ring preform; and infusing a thermoset resin into the stator vane ring preform and curing the resin to form the integral stator vane ring.

The term "structural" is intended to mean that the stator vane ring is configured to transfer structural loads (e.g. torque and lateral loads) between the components to which it is attached, for example across the core annulus between a core body of the core engine to the core fairing, or across the bypass duct between the core fairing and a fan casing, or to transfer loads across an air intake between a fan axis and the fan casing. This is in contrast to stator vane rings which are configured to withstand aerodynamic loads, but are not configured to transfer significant structural loads.

The structural stator vane ring may therefore be, for example, an outlet guide vane (OGV) ring disposed at an upstream end of the bypass duct of a gas turbine engine, an outer ring of an intermediate case disposed in the bypass duct downstream of the outlet guide vane ring, an engine stator section (ESS) ring disposed in a core inlet of the engine core, or a front frame disposed upstream of a fan.

The definition of a stator vane ring as disposed "in the core inlet" means that the stator vane ring is the most upstream component disposed in and radially traversing the annular flow path through the engine core (which commences downstream of the fan at the lip of the core fairing). As will be appreciated by those skilled in the art, the stator vane ring in this location provides a structural load path between the core body (e.g. support structures such as a front bearing housing supporting one or more shafts of the engine) and the core fairing, which load path extends through the outlet guide vanes to the fan casing and pylon.

The disclosure herein relates to stator vane rings which are configured to withstand the structural loads (e.g. torque and lateral loads) applied at the respective locations as described above. By manufacturing the stator vane ring according to the methods disclosed herein, a lightweight stator vane ring can be provided using composite materials which nevertheless is sufficiently strong to withstand the structural loads at this location of the engine. In contrast, downstream stator vanes provided between successive rotor stages are generally configured to withstand aerodynamic loads, but are not configured to transfer significant structural loads across the core annulus.

Fibre jointing methods may include tufting, stitching or direct insertion of pins.

The fibre reinforcement material for the inner annulus preform and/or the outer annulus preform may be a fabric comprising a two-dimensional weave or a three-dimensional weave. The fabric may be uni-axial, bi-axial or tri-axial.

Providing the plurality of vane preforms may comprise providing at least one hollow vane preform. A hollow vane preform is intended to mean that the vane preform comprises an outer layer of fibre reinforcement material defining an interior cavity, wherein the cavity may be empty, or may be filled with other material.

Providing the hollow vane preform may comprise winding fibre reinforcement material around a central core.

The fibre reinforcement material for the vane preforms may be a fabric having a two-dimensional or a three-dimensional weave.

The hollow vane preform may be filled with a central core of a different material. The central core may comprise a visco-elastic damping compound. The damping compound may comprise a material with an elastic modulus between 0.5 and 100 N/mm². The hollow vane preform may comprise pre-cured carbon rods in a central core.

The central core may comprise a sacrificial material having a melting point below 230 degrees centigrade, and wherein the method comprises melting the central core after curing the resin to form an empty hollow vane.

The inner annulus preform may be wound to comprise apertures. Empty hollow regions of the vane preforms corresponding to the empty hollow vanes may be arranged to align with the apertures of the inner annulus preform.

The method may comprising machining the plurality of vane performs to form and/or finish a hollow centre in at least one of the vane performs after curing the resin.

The fibre reinforcement material for the inner annulus perform may comprise a binder. The method may comprise activating a binder on the inner annulus preform by applying heat before arranging the vane preforms around the inner annulus preform, so as to inhibit deformation of the inner annulus preform during subsequent arrangement of the vane preforms and resin infusion.

The fibre reinforcement material for the plurality of vane preforms may comprise a binder. The method may comprise providing stabilised vane preforms so as to inhibit deformation of the vane preforms during subsequent arrangement of the vane preforms and resin infusion.

Connecting each vane preform to the inner annulus may comprise bifurcating the vane preform at an inner annulus end and connecting bifurcated ends of the vane preform to the inner annulus preform using a fibre jointing method.

Connecting each vane preform to the outer annulus may comprise bifurcating the vane preform at an outer annulus end and connecting the bifurcated ends of the vane preform to the outer annulus preform using a fibre jointing method.

The method may comprise connecting auxiliary plies of fibre reinforcement material between each of the plurality of vane preforms over the bifurcated ends of each of the vane preforms using a fibre jointing method, before infusing and curing the resin.

According to a second aspect, there is provided a structural, thermoset infused fibre reinforced composite, integral stator vane ring for a core inlet, a bypass duct, or an air intake of a gas turbine engine; the stator vane ring comprising: an inner annulus; an outer annulus concentric with the inner annulus; and a plurality of vanes disposed between the inner annulus and the outer annulus, and integrally connected to the inner annulus and the outer annulus forming a monolithic structure.

At least some of the stator vanes may be hollow stator vanes comprising an interior cavity defined by an outer layer of fibre reinforcement material.

At least some of the hollow stator vanes may comprise a central core of a different material within the interior cavity. The different material may be a visco-elastic damping compound. The damping material may comprise a material with an elastic modulus between 0.5 and 100 N/mm$^2$.

At least some of the hollow stator vanes may comprise an empty interior cavity.

The inner annulus and the outer annulus may comprise apertures which are aligned with empty hollow regions of the hollow stator vanes.

The interior cavity of the stator vanes may comprise a plurality of pre-cured carbon rods.

According to a third aspect, there is provided a method of manufacturing a structural, thermoplastic-infused fibre reinforced composite, integral stator vane ring for a core inlet, a bypass duct, or an air intake of a gas turbine engine, the method comprising: forming an inner annulus by winding fibre reinforced thermoplastic material around an inner mandrel to form an inner annulus preform, and consolidating the inner annulus preform; forming an outer annulus by winding fibre reinforced thermoplastic material around an outer mandrel to form an outer annulus preform, and consolidating the outer annulus preform; providing a plurality of fibre reinforced thermoplastic vanes; arranging the plurality of vanes between the inner annulus and the outer annulus; and thermally welding respective ends of the plurality of vanes to the inner annulus and the outer annulus.

At least one of the plurality of vanes may be hollow vanes. A hollow vane is intended to mean that the vane comprises an outer layer of fibre reinforcement material defining an interior cavity, wherein the cavity may be empty, or may be filled with other material.

The hollow vanes may comprise a central core of a different material. The central core may comprise a visco-elastic damping compound.

The inner annulus and/or the outer annulus may be laid-up to comprise apertures for aligning with hollow regions of the hollow vanes. The method may comprise drilling apertures into the inner annulus and/or the outer annulus for aligning with hollow regions of the hollow vanes.

According to a fourth aspect, there is provided a structural, thermoplastic infused fibre reinforced composite, integral stator vane ring for a core inlet, a bypass duct, or an air intake of a gas turbine engine; the stator vane ring comprising: an inner annulus; an outer annulus concentric with the inner annulus; and a plurality of vanes disposed between the inner annulus and the outer annulus, and integrally connected to the inner annulus and the outer annulus to form a monolithic structure.

According to a fifth aspect there is provided a gas turbine engine comprising a stator vane ring in accordance with the second or fourth aspects, wherein the stator vane ring is disposed in one of a core inlet, a bypass duct or an air intake.

The gas turbine engine may comprise an engine core defining an annular flow path for a core gas flow, the engine core having the core inlet between a core body and a core fairing, wherein the stator vane ring is disposed in the core inlet and serves as a structural support for transferring loads between the core body and the core fairing. The core body may comprise the portion of the core radially-inward of the annular flow path.

The engine core may comprise a turbine, a compressor, and a core shaft connecting the turbine to the compressor. The gas turbine engine may further comprise: a fan located upstream of the engine core, the fan comprising a plurality of fan blades; and a gearbox that receives an input from the core shaft. The gearbox may receive input from the core shaft and may output drive to the fan so as to drive the fan at a lower rotational speed than the core shaft. The gearbox may be an epicyclic gearbox. An annulus or ring gear of the epicyclic gearbox may be structurally supported by coupling to the stator vane ring.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being Jkg−1 K−1/(ms−1)2). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e. the values may form upper or lower bounds), for example in the range of from 80 Nkg-1 s to 100 Nkg-1 s, or 85 Nkg-1 s to 95 Nkg-1 s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
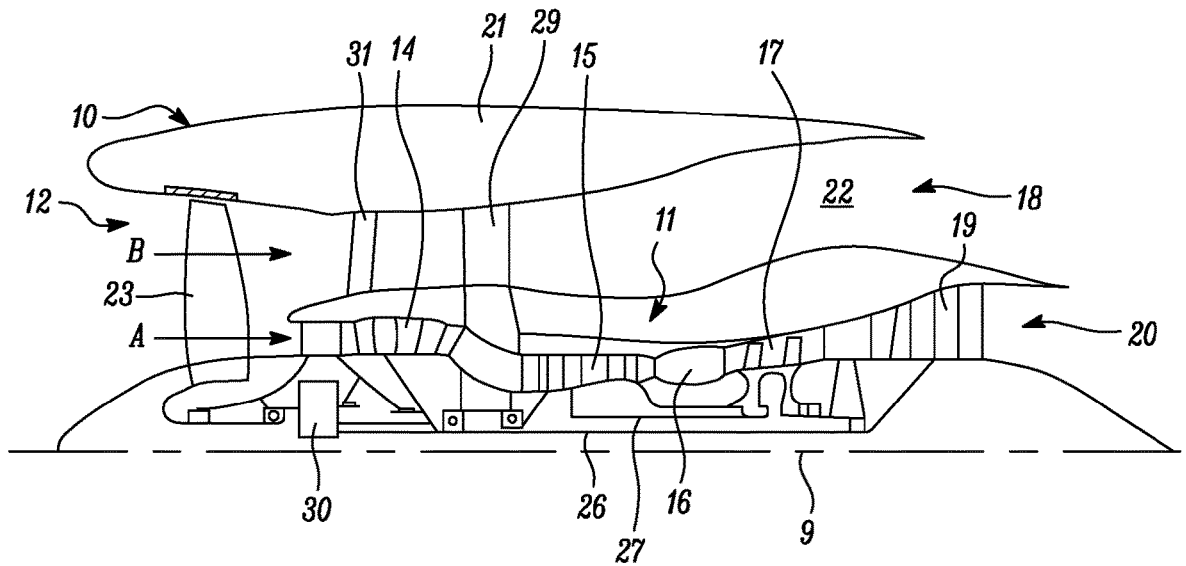
FIG. 1 is a sectional side view of a first example gas turbine engine.

FIG. 1 illustrates a first example gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. An outlet guide vane ring 31 is disposed in the bypass duct 22, at an upstream end of the bypass duct 22. An intermediate case 29 is disposed downstream of the outlet guide vane ring 31, and comprises an outer stator vane ring and an inner stator vane ring. The outer stator vane ring is disposed within the bypass duct 22 and the inner stator vane ring of the intermediate case is disposed within the engine core 11. The outlet guide vane ring 31 and the outer stator vane ring of the intermediate case 29 are configured to transfer loads from the engine core 11 to the nacelle 21.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
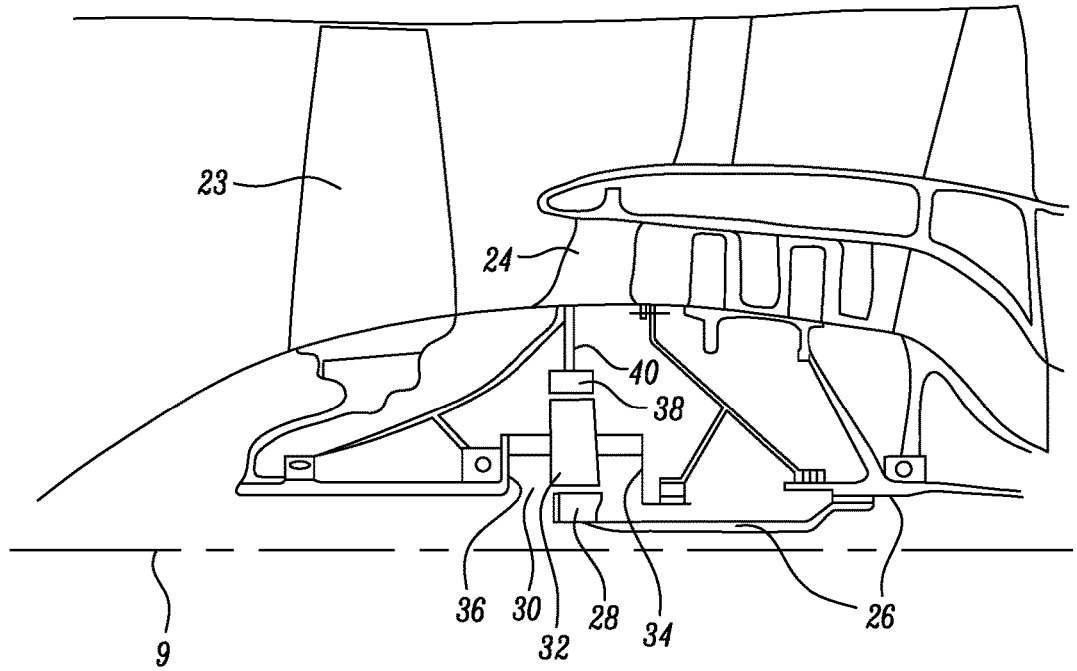
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
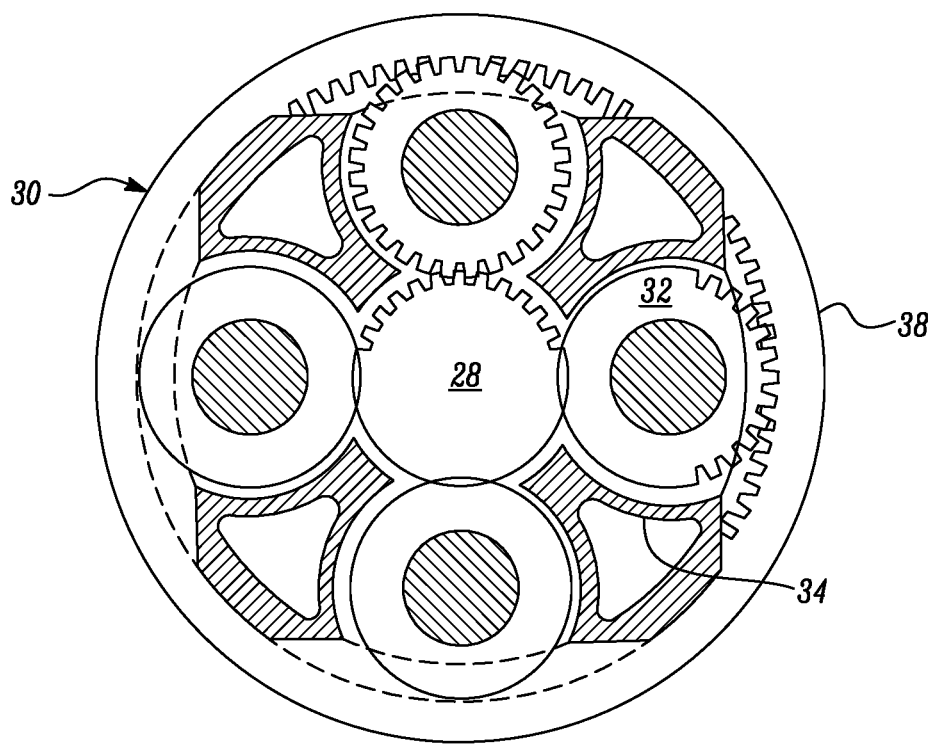
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
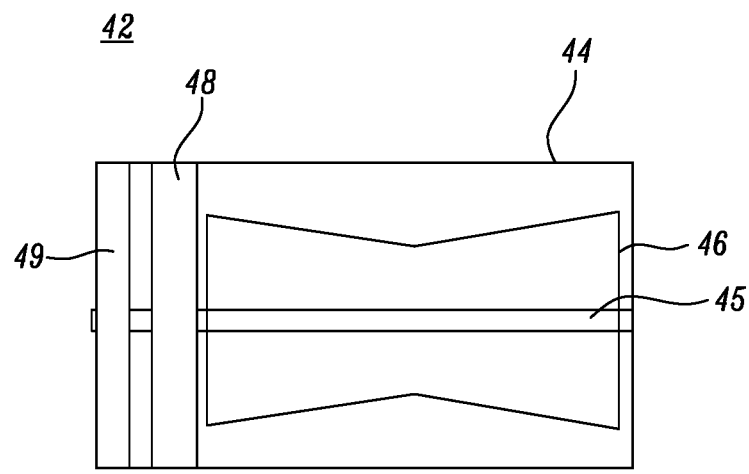
FIG. 4 schematically shows a sectional side view of a second example gas turbine engine.

FIG. 4 shows a sectional side view of a second example gas turbine engine 42. In this example, the gas turbine engine 42 comprises a fan casing 44 enclosing an engine core 46. A fan 48 is disposed upstream of the engine core 46 in a similar manner to the fan 23 in the first example gas turbine engine 10. A front frame 49 is disposed upstream of the fan 48 in an air intake of the gas turbine engine. The front frame 49 is configured to transfer the loads across the air intake from an axis 45 about which the fan 48 rotates, to the fan casing 44.

Figure 5:
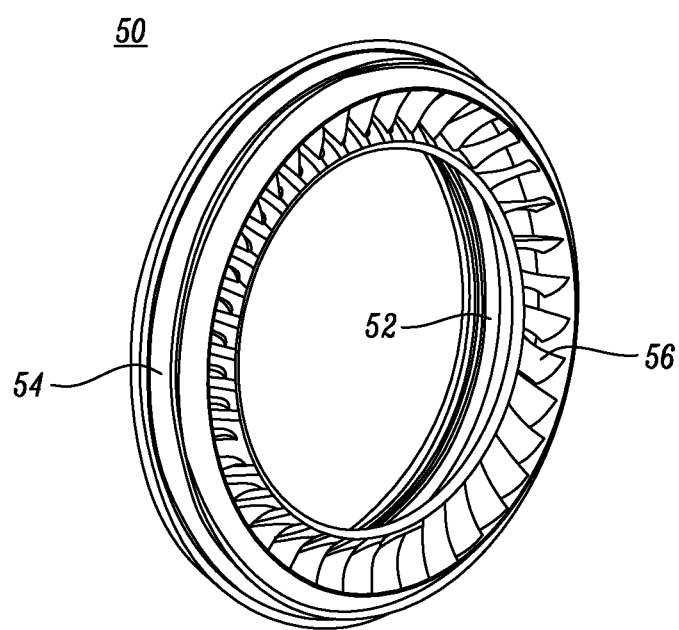
FIG. 5 schematically shows a perspective view of an integral composite stator vane ring.

FIG. 5 shows a fibre reinforced composite stator vane ring 50. In this example, the stator vane ring is an engine stator section (ESS) for a core inlet of the gas turbine engine 10, 42. In other examples, the stator vane ring may be an outlet guide vane ring, an outer ring of an intermediate case or a front frame. The stator vane ring 50 in this example is disposed behind (i.e. downstream of) the fan 23 in a core inlet of the core engine, and is configured to provide a structural load path across the engine core 11 annulus (i.e. between a core body of the core 11 which is radially inward of a core annulus of the engine core and the core fairing). The stator vane ring 50 may be installed in a core engine such as that described above with respect to FIGS. 1-3 in the position of the structural support 24 (i.e. within the core inlet). Structural loads may then be transmitted from the core fairing to the nacelle 21 by a load path across the bypass duct 22, such as the outlet guide vanes (OGVs). The stator vane ring 50 is therefore configured to withstand operating torque and lateral loads. References herein to a stator vane ring being disposed in the core inlet are intended to mean that the stator vane ring is the most upstream structural component within the core annulus defined between the core body and the core fairing. The stator vane ring 50 comprises an inner annulus 52, an outer annulus 54 which is concentric with the inner annulus 52, and a plurality of stator vanes 106 disposed between, and attached to, the inner annulus 52 and the outer annulus 54. The plurality of stator vanes 56 are evenly distributed around the circumference of the inner annulus 52 and the outer annulus 54.

In this example, the stator vanes 56 are hollow. Hollow is intended to mean that the stator vane 56 comprises an outer layer of fibre reinforcement material defining an interior cavity (not shown), which may be empty, or filled with a different material.

In this example, at least some of the stator vanes 56 have an empty interior cavity, defining empty hollow stator vanes 56. The inner annulus 52 comprises apertures (not shown) which are aligned with empty hollow regions of the empty hollow stator vanes 56 such that services, such as electrical wiring or oil, can pass through the stator vane ring 50 via the stator vanes 56.

In this example, some of the stator vanes 56 comprise a central core disposed within the interior cavity, where the central core comprises a visco-elastic damping compound, such that when the material is deformed it exhibits both viscous and elastic behaviour through the dissipation and storage of mechanical energy. Suitable damping compounds include a polymer blend, a structural epoxy resin and liquid crystal siloxane polymer comprise a modulus of elasticity in the range 0.5-100 N/mm$^2$.

In some examples, all of the stator vanes 56 may be hollow, or they may all comprise a central core of visco-elastic damping compound. In yet more examples, some or all of the stator vanes may not be hollow (i.e. the stator vane may be formed of solid fibre reinforced composite material, such that it may not have an interior cavity). Having hollow stator vanes 56 as in this example can reduce the overall weight of the stator vane ring, and therefore of the engine.

In this example, the stator vane ring 50 comprises a fibre reinforced composite material in the form of a fabric having a three-dimensional (3D) weave. In other examples, the stator vane ring may comprise a woven fibre reinforced composite material in the form of a fabric having a two-dimensional (2D) weave, or any other suitable form of fibre composite material. In this example, the fibre composite material of the stator vane ring 50 is tri-axial. In some examples, the fibre composite material may be uni-axial or bi-axial.

Figure 6:
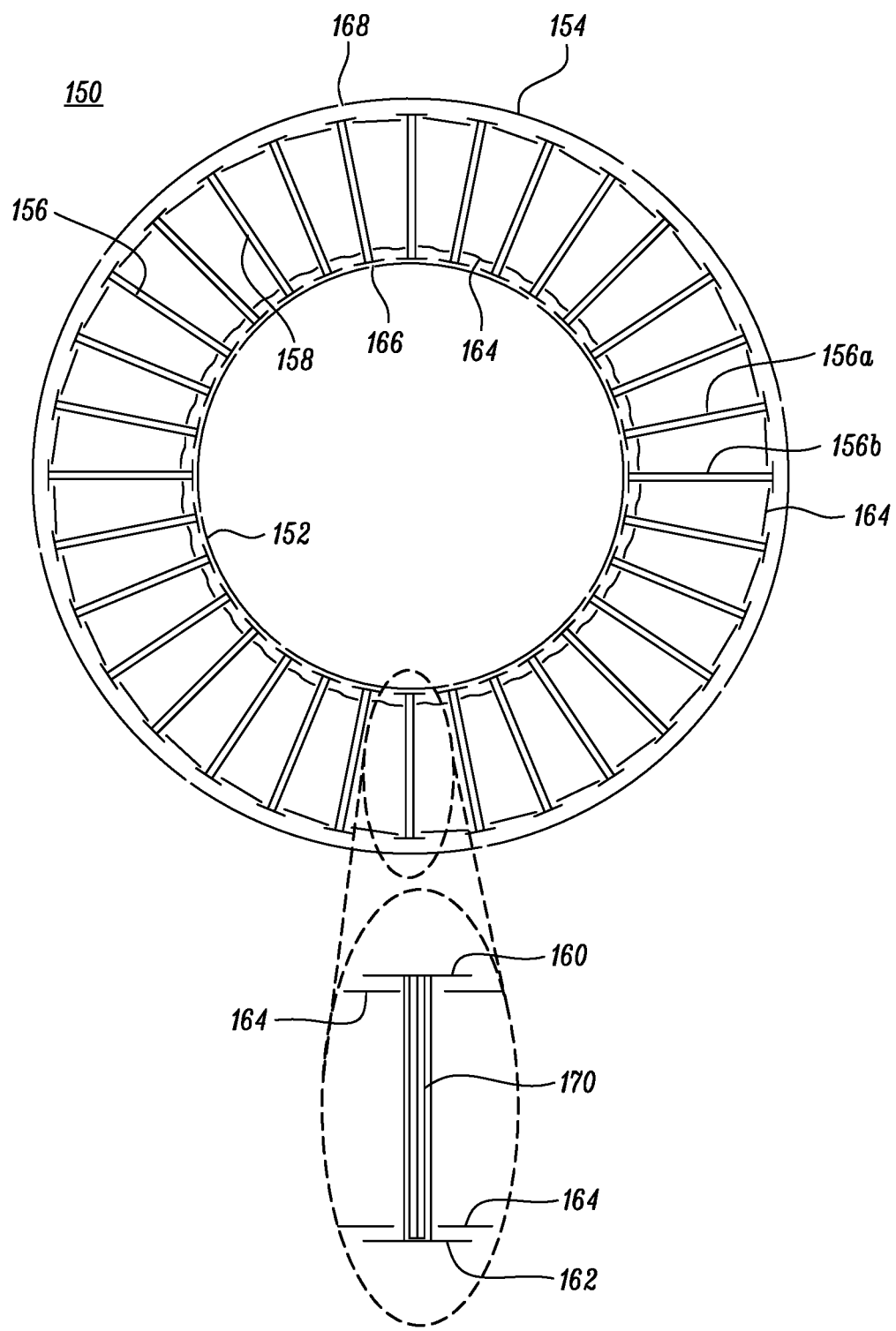
FIG. 6 schematically shows a cross sectional view of a stator vane ring preform.

FIG. 6 shows a cross sectional view of a stator vane ring preform 150 which can be manufactured by a method 100 as described below with reference to FIG. 7. The stator vane ring preform 150 is configured to form the stator vane ring 50 when cured.

The stator vane ring preform 150 comprises an annular inner annulus preform 152, an annular outer annulus preform 154 and a plurality of vane preforms 156 disposed between the inner annulus preform 152 and the outer annulus preform 154. The inner annulus preform 152 corresponds to the inner annulus 52 of the stator vane ring 50, the outer annulus preform 154 corresponds to the outer annulus 54 of the stator vane ring 50, and the plurality of vane preforms 156 correspond to the plurality of stator vanes 56 of the stator vane ring 50.

The vane preforms 156 in this example are all hollow, such that they define interior cavities. The hollow vane preforms 156 comprise bifurcated ends at a radially inner end, and at a radially outer end of each vane preform 156. The bifurcated ends of the vane preforms 156 define a pair of inner flanges 160 at the radially inner end, and a pair of outer flanges 162 at the radially outer end of the vane preform 156, such that the vane preform 156 defines an I-section in cross-section.

Some of the hollow vane preforms 156 comprise empty interior cavities, forming empty hollow vane preforms. In this example, the hollow vane preforms 156a which will form the empty hollow stator vanes 56 of the stator vane ring 50 are filled with a sacrificial material, which is removed after curing of the stator vane ring preform 150, as will be explained below. These hollow vane preforms 156 will be collectively termed empty hollow vane preforms 156a. The inner annulus preform 152 comprises apertures 166 which align with the empty hollow vane preforms 156a. The outer annulus preform 154 comprises apertures 168 which also align with the empty hollow vane preforms 156a.

Some of the hollow vane preforms 156 in this example comprise a central core 158 of a visco-elastic damping compound, forming damping hollow vane preforms 156b. The damping hollow vane preforms 156b may comprise a plurality of pre-cured carbon rods 170, disposed in the interior cavity. The rods may be solid or hollow, and may improve stiffness locally in the vane preforms.

The stator vane ring preform 150 further comprises a plurality of auxiliary plies 164, which are disposed between adjacent vane preforms 156 and located over the inner flanges 160 and the outer flanges 162 of adjacent vane preforms 156 so that the bifurcated flanges 160, 162 are retained between the respective annulus preform 152, 154 and the auxiliary plies 164.

Figure 7:
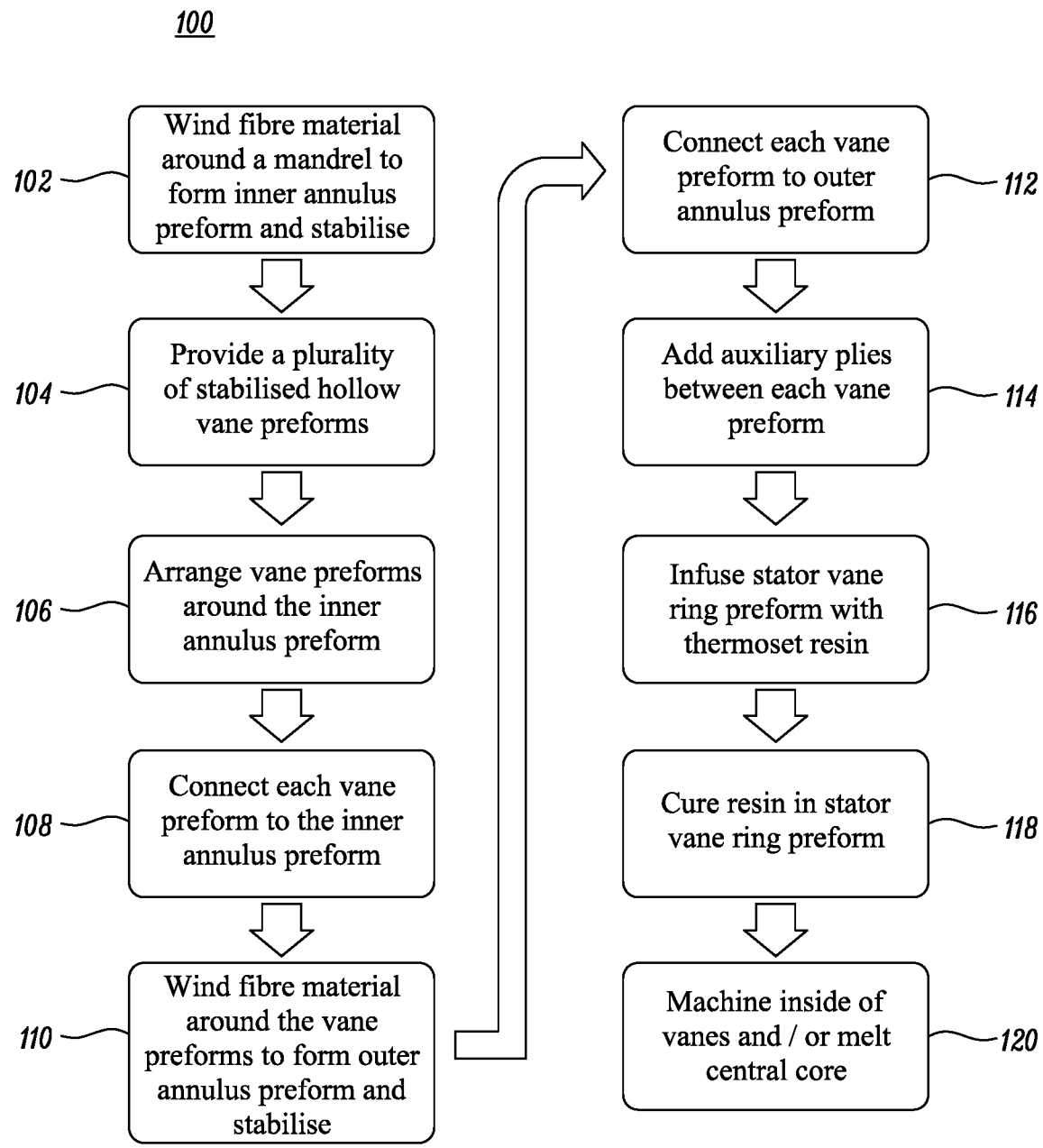
FIG. 7 is a flow chart showing steps of a method of manufacturing a thermoset infused composite integral stator vane ring.

FIG. 7 is a flowchart showing steps of a method 100 for manufacturing a thermoset infused integral stator vane ring 50. The method 100 begins with block 102, which comprises winding a fibre reinforcement material around a mandrel to form the inner annulus preform 152.

Block 102 also comprises stabilising the inner annulus preform 152 with a binder. Stabilising a preform is intended to mean activating a binder on a fibre reinforced composite which has been treated with the binder (which can be in the form of a powder), so that deformation of the preform is inhibited during subsequent steps of the method 100. In this example, the binder may be a resin for use in a composite, such as Hexcel® HP03 or E01, or Solvay CYCOM® 782.

In this example, the inner annulus preform 152 is wound around the mandrel to form apertures 166 corresponding to empty hollow regions of the empty hollow vane preforms 156a, and which are located to align with the empty hollow regions of the empty hollow vane preforms 156a. In other examples, such apertures may be machined.

Block 104 of the method 100 comprises providing a plurality of vane preforms 156 comprising fibre reinforcement material. The vane preforms 156 which are provided may also be stabilised with a binder so as to inhibit their deformation during subsequent assembly.

The vane preforms 156 in this example are all hollow. In some examples, only some of the vane preforms may be hollow. In other examples, all of the vane preforms may be solid such that none of the vane preforms are hollow.

At least some of the hollow vane preforms 156 in this example are empty hollow vane preforms 156a, which are filled with a sacrificial material, such as bismuth based alloys, which has a melting point below approximately 230 degrees centigrade. In some examples, the sacrificial material may be a water soluble plaster or an elastomeric bladder. The interior cavity 158 of these hollow vane preforms 156a therefore comprises a central core 158 of sacrificial material enclosed by an outer layer of fibre reinforcement material. The empty hollow vane preforms 156a comprising a central core of sacrificial material correspond to the empty hollow stator vanes 56 in the stator vane ring 50.

In this example, some of the hollow vane preforms are damping hollow vane preforms 156b which comprise a central core 158 of a visco-elastic damping compound comprising a plurality of pre-cured carbon rods 170, enclosed by an outer layer of fibre reinforcement material. These hollow vane preforms 156 correspond to the stator vanes 56 which comprise a central core of visco-elastic damping compound in the stator vane ring 50.

In this example, the fibre reinforcement material for the inner annulus preform 152 and the vane preforms 156 is dry fibre reinforcement material, treated with a binder in the form of a powder. In other examples, the fibre reinforcement material may be pre-impregnated with resin.

In block 106, the method comprises arranging the plurality of vane preforms 156 around the inner annulus preform 152. The plurality of vane preforms 156 are distributed evenly around the circumference of the inner annulus preform 152, to extend radially from the inner annulus preform 152. In this example, there are 32 vane preforms 156. Therefore, each vane preform is distributed 11.25 degrees apart around the inner annulus preform 152. In other examples, there may be any number of vane preforms corresponding to the number of stator vanes required in the stator vane ring.

In block 108, the method 100 comprises connecting each vane preform 156 to the inner annulus preform 152. In this example, connecting the vane preforms 156 to the inner annulus preform 152 comprises connecting the inner flanges 160 of the vane preform 156 to the inner annulus preform 152 using a fibre jointing method. In this example, the fibre jointing method comprises stitching the inner flanges 160 of each vane preform 156 to the inner annulus preform 152. In other examples, the fibre jointing method may comprise tufting or pinning.

In block 110, the method 100 comprises winding fibre reinforcement material around the vane preforms 156 to form the outer annulus preform 154. In this example, the fibre reinforcement material is treated with a binder, and the outer annulus preform 154 is stabilised. In other examples, there may be no binder, and therefore no stabilisation of the outer annulus preform, or the fibre reinforcement material may be pre-impregnated with resin. The outer annulus preform 154 is wound to comprise apertures 168 which have a shape corresponding to empty hollow regions of the empty hollow vane preforms 156a, and which are aligned with the hollow regions of the vane preforms 156.

In this example, fibre reinforcement material is wound to produce a fabric for the inner annulus preform 152, the vane preforms 156 and the outer annulus preform 154, where the fabric has a three-dimensional (3D) weave. In some examples, the preforms may comprise a fabric having a two-dimensional (2D) weave. In other examples, the fibre reinforcement material may be wound such that the inner annulus preform, the vane preforms and the outer annulus preform have any combination of 2D and 3D weaves.

In block 112, the method 100 comprises connecting each vane preform 156 to the outer annulus preform 154. In this example, connecting the vane preforms 156 to the outer annulus preform 154 comprises connecting the outer flanges 162 of each vane preform 156 to the outer annulus preform 154 with a fibre jointing method. In this example, the fibre jointing method also comprises stitching the outer flanges 162 to the outer annulus preform 154. In other examples, the fibre jointing method may be tufting or pinning. It will be appreciated that the connection of the vane preforms to the outer annulus may occur before the stabilising of the outer annulus preform.

In block 114, the method 100 comprises adding auxiliary plies 164 of fibre reinforcement material between each vane preform 156 over the inner flanges 160 and outer flanges 162 of adjacent vane preforms 156. The auxiliary plies 164 are connected to the inner flanges 160 and the outer flanges 162 of the vane preforms 156 by a fibre jointing method, such as stitching, tufting or pinning. Adding auxiliary plies 164 between the vane preforms 156 helps to create a smooth aerodynamic surface for air flowing through the stator vane ring 50 in use.

In block 116, the method 100 comprises infusing the stator vane ring preform 150 with a thermoset resin. If the fibre reinforcement material comprises pre-impregnated resin, then block 116 is omitted from the method 100, as the fibre material already comprises an infused resin.

In block 118, the method 100 comprises curing the resin in the stator vane ring preform 150 by applying heat and pressure to the stator vane ring preform 150 to form a cured integral stator vane ring 50.

In block 120, the method 100 comprises heating the stator vane preforms 156 to melt the central core 158 of sacrificial material, in order to produce the empty hollow stator vanes 56 of the stator vane ring 50. It will be appreciated that heating the stator vane preforms 156 to melt the central core 158 of sacrificial material may occur before curing the resin in the stator vane ring preform 150. The melting temperature of the visco-elastic damping compound is above the melting temperature of the sacrificial material, and therefore, the visco-elastic damping compound remains in place in the respective stator vane interior cavities.

In examples where there is no central core comprising a sacrificial material for removal from the interior cavity of stator vanes by melting, block 120 may be omitted from the method 100. In other examples, the stator vane preforms may not be hollow, and block 120 may comprise machining the stator vanes to form an interior cavity. In yet other examples, after melting the sacrificial material in the central core, the interior cavity of the vanes may require machining/finishing.

In other examples, the hollow vane preforms may alternatively or additionally be provided with pre-cured carbon rods in the empty interior cavity of the hollow stator vane, or in a central core of material in the hollow stator vane.

Figure 8:
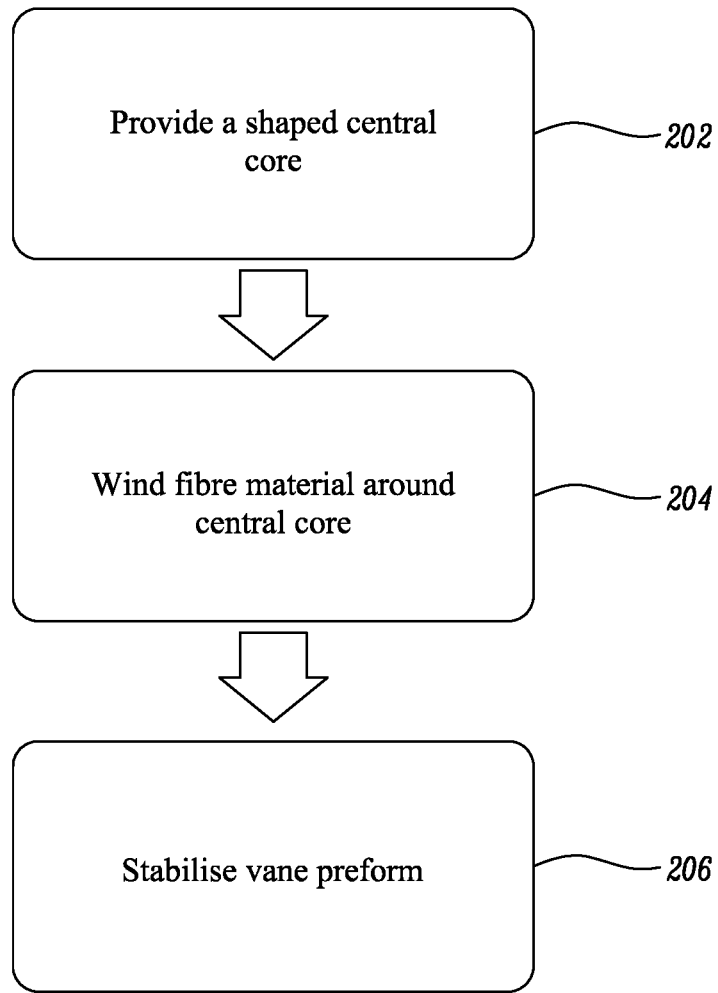
FIG. 8 is a flow chart showing steps of a method for providing a vane preform.

FIG. 8 is a flow chart showing steps of a method 200 for providing a stator vane preform 156 as described above.

In block 202, the method comprises providing a shaped central core 158 which may be moulded or shaped by any suitable means to define a stator vane lay-up surface. The central core may comprise sacrificial material, such as a bismuth based alloy or a water soluble plater, or a viscoelastic damping compound such, as described herein. The central core may also comprise a plurality of pre-cured carbon rods 170, as described herein.

In block 204, the method comprises winding fibre reinforcement material around the central core, on the vane lay-up surface defined by the central core 158 to form the outer layer of fibre reinforcement material, which defines the interior cavity 158 of the stator vane preform 156, and to define a bifurcated pair of inner flanges 160 and outer flanges 162 at each end of the stator vane preform 156.

The stator vane preform 156 is shaped into an I-section having flanges 160, 162. The fibre reinforcement material in this example is treated with a binder and in block 206, the method comprises stabilising the stator vane preform by applying heat and pressure to the stator vane preform 156 to stabilise it. In other examples, the reinforcement material may be pre-impregnated with resin, and partially cured to stabilise the stator vane preform. In further examples, the stator vane preform may not be stabilised at all, such that the central core is relied on to provide the structural integrity of the stator vane preform.

Figure 9:
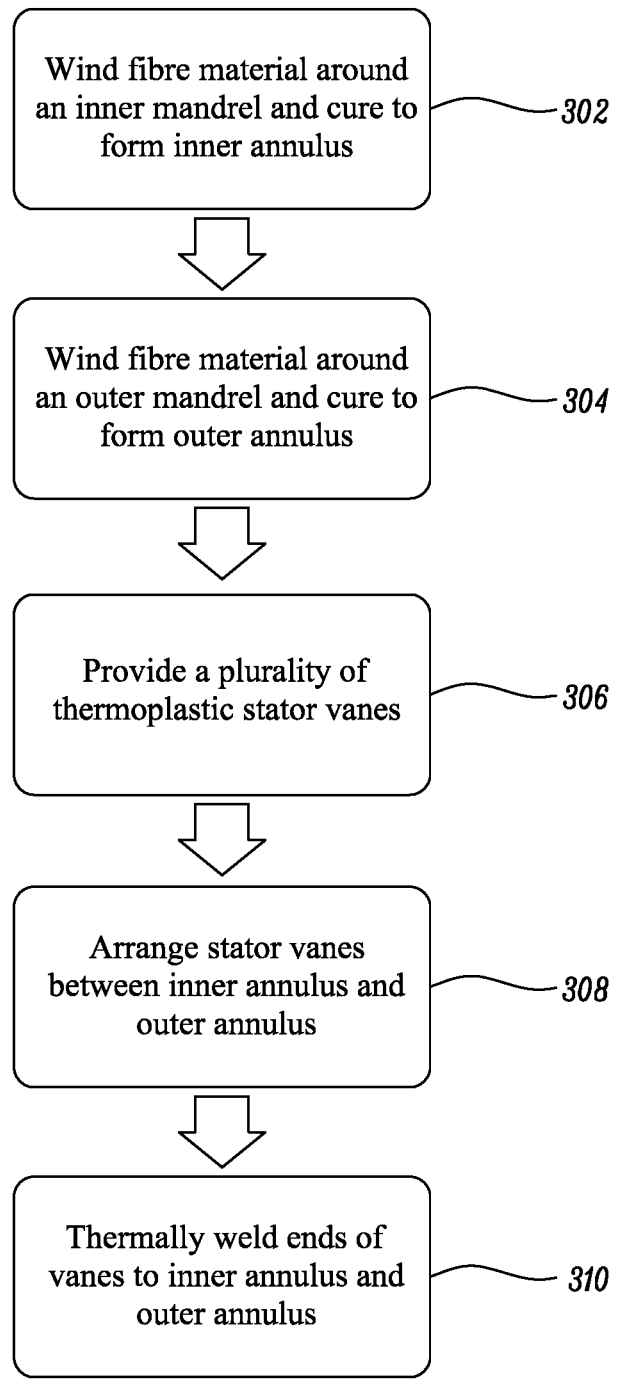
FIG. 9 is a flow chart showing steps of a method of manufacturing a thermoplastic infused composite integral stator vane ring.

FIG. 9 is a flow chart showing steps of a method 300 for manufacturing a structural, thermoplastic infused, integral stator vane ring. The thermoplastic stator vane ring may comprise any or all of the same structural features as the thermoset stator vane ring 50 described above with reference to FIG. 5, and like reference numerals will be used in the following description.

In block 302, the method 300 comprises winding pre-impregnated (with thermoplastic resin) fibre reinforcement material around an inner mandrel, and curing the thermoplastic resin by applying heat and pressure, to form the inner annulus 52.

In block 304, the method 300 comprises winding pre-impregnated fibre reinforcement material around an outer mandrel, and curing the thermoplastic resin, to form the outer annulus 54.

In block 306, the method 300 comprises providing a plurality of thermoplastic stator vanes 56. The thermoplastic stator vanes 56 comprise the same structural features as the thermoset stator vanes 56. Therefore, providing thermoplastic stator vanes may comprise similar steps to the method 200 for providing stator vane preforms 156 as described with reference to FIG. 8. The method for providing thermoplastic stator vanes 56 may differ in that the fibre material in block 204 may be thermoplastic pre-impregnated fibre reinforcement material, and that stabilising the vane preform in block 206 is replaced with curing the vane preform to form the thermoplastic vane 56.

In block 308, the method 300 comprises arranging the plurality of thermoplastic stator vanes 56 between the inner annulus 52 and the outer annulus 54. The stator vanes 56 are distributed evenly around the circumference of the inner annulus 52 and the outer annulus 54.

In block 310, the method 300 comprises thermally welding respective inner flanges 160 of each stator vane 56 to the inner annulus 52, and respective outer flanges 162 of each stator vane 56 to the outer annulus 54. The thermoplastic resin from the inner annulus 52 and inner flange 160 of the stator vanes 56 fuses under thermal welding, and the thermoplastic resin from the outer flanges 162 of the stator vanes 56 and the outer annulus 54 fuses under thermal welding, such that an integral structural stator vane ring 50 is formed.

Although it has been described that the method is used to make an ESS 50, it should be appreciated that this method can be applied to make any composite fibre reinforced stator vane ring for use in an engine, such as an outlet guide vane ring, an intermediate case or a front frame.

We claim:

1. A method of manufacturing an integral thermoset infused fibre reinforced composite, structural stator vane ring for a core inlet, a bypass duct or an air intake of a gas turbine engine, the method comprising:
   winding fibre reinforcement material around a mandrel to form an inner annulus preform;
   providing a first vane preform and a second vane preform of a plurality of vane preforms comprising fibre reinforcement material, the first vane preform being separate from the second vane preform;
   bifurcating the first vane preform at an inner annulus end of the vane preform into a first inner flange extending in a first circumferential direction and a second inner flange extending in a second circumferential direction opposite the first circumferential direction and at an outer annulus end of the vane preform into a first outer flange extending in the first circumferential direction and a second outer flange extending in the second circumferential direction;
   bifurcating the second vane preform at an inner annulus end of the vane preform into a third inner flange extending in the first circumferential direction and a fourth inner flange extending in the second circumferential direction and at an outer annulus end of the vane preform into a third outer flange extending in the first circumferential direction and a fourth outer flange extending in the second circumferential direction;
   arranging the first and second vane preforms around the inner annulus preform including arranging the first single vane preform at a first circumferential position around the inner annulus preform and the second single vane preform at a second circumferential position spaced apart from the first circumferential position such that a terminal end of the second inner flange is adjacent to and spaced apart from a terminal end of the third inner flange and a terminal end of the second outer flange is adjacent to and spaced apart from a terminal end of the third outer flange; and
   connecting the first, second, third, and fourth inner flanges of the vane preform to the inner annulus preform using a fibre jointing method;
   winding fibre reinforcement material around the plurality of vane preforms to form an outer annulus preform and connecting the outer annulus preform to each of the plurality of vane preforms using a fibre jointing method to produce a stator vane ring preform; and
   infusing a thermoset resin into the stator vane ring preform and curing the resin to form the integral stator vane ring.

2. The method as claimed in claim 1, wherein the fibre reinforcement material for the inner annulus preform and/or the outer annulus preform is a fabric comprising a two-dimensional weave or a three-dimensional weave.

3. The method as claimed in claim 1, wherein providing the plurality of vane preforms comprises providing at least one hollow vane preform.

4. The method as claimed in claim 3, wherein providing the hollow vane preform comprises winding fibre reinforcement material around a central core.

5. The method as claimed in claim 3, wherein the hollow vane preform is filled with a central core of a different material.

6. The method as claimed in claim 3, wherein the hollow vane preform comprises pre-cured carbon rods in a central core.

7. The method as claimed in claim 4, wherein the central core comprises a sacrificial material having a melting point below 230 degrees centigrade, and wherein the method comprises melting the central core after curing the resin to form an empty hollow vane.

8. The method as claimed in claim 1, wherein the inner annulus preform is wound to comprise apertures and wherein empty hollow regions of the vane preforms corresponding to the empty hollow vanes are arranged to align with the apertures of the inner annulus preform.

9. The method as claimed in claim 1, comprising machining the plurality of vane performs to form and/or finish a hollow centre in at least one of the vane performs after curing the resin.

10. The method as claimed in claim 1, wherein the fibre reinforcement material for the inner annulus perform comprises a binder, and wherein the method comprises activating a binder on the inner annulus preform to stabilise the inner annulus by applying heat before arranging the vane preforms around the inner annulus preform, so as to inhibit deformation of the inner annulus preform during subsequent arrangement of the vane preforms and resin infusion.

11. The method as claimed in claim 1, wherein the fibre reinforcement material for the plurality of vane preforms comprises a binder, and wherein the method comprises providing stabilised vane preforms so as to inhibit deformation of the vane preforms during subsequent arrangement of the vane preforms and resin infusion.

12. The method as claimed in claim 1, wherein connecting the first, second, third, and fourth outer flanges to the outer annulus preform using a fibre jointing method.

13. The method as claimed in claim 12, comprising connecting auxiliary plies of fibre reinforcement material between each of the plurality of vane preforms over the first, second, third, and fourth inner flanges of each of the first and second vane preforms using a fibre jointing method, before infusing and curing the resin.

14. The method of claim 1, wherein the first and second vane preforms are arranged directly adjacent to each other such that no additional vane preforms are arranged circumferentially between the first and second vane preforms.

15. The method of claim 1, wherein the first vane preform together with the first and second inner flanges and the first and second outer flanges form an I-shape, wherein the second vane preform together with the third and fourth inner flanges and the third and fourth outer flanges form an I-shape, wherein a gap is defined between the spaced apart terminal ends of the second and third inner flanges, and wherein a gap is defined between the spaced apart terminal ends of the second and third outer flanges.

16. A method of manufacturing an integral thermoset infused fibre reinforced composite, structural stator vane ring for a core inlet, a bypass duct or an air intake of a gas turbine engine, the method comprising:
   winding fibre reinforcement material around a mandrel to form an inner annulus preform;
   providing a first vane preform and a second vane preform of a plurality of vane preforms comprising fibre reinforcement material, the first vane preform being separate from the second vane preform;
   bifurcating the first vane preform at an inner annulus end of the vane preform into a first inner flange extending in a first circumferential direction and a second inner flange extending in a second circumferential direction opposite the first circumferential direction and at an outer annulus end of the vane preform into a first outer flange extending in the first circumferential direction and a second outer flange extending in the second circumferential direction;
   bifurcating the second vane preform at an inner annulus end of the vane preform into a third inner flange extending in the first circumferential direction and a fourth inner flange extending in the second circumferential direction and at an outer annulus end of the vane preform into a third outer flange extending in the first circumferential direction and a fourth outer flange extending in the second circumferential direction;
   arranging the first and second vane preforms around the inner annulus preform including arranging the first single vane preform at a first circumferential position around the inner annulus preform and the second single vane preform at a second circumferential position spaced apart from the first circumferential position such that a terminal end of the second inner flange is adjacent to and spaced apart from a terminal end of the third inner flange and a terminal end of the second outer flange is adjacent to and spaced apart from a terminal end of the third outer flange; and
   connecting the first, second, third, and fourth inner flanges of the vane preform to the inner annulus preform using a fibre jointing method;
   winding fibre reinforcement material around the plurality of vane preforms to form an outer annulus preform and connecting the outer annulus preform to each of the plurality of vane preforms using a fibre jointing method to produce a stator vane ring preform; and
   infusing a thermoset resin into the stator vane ring preform and curing the resin to form the integral stator vane ring,
   wherein providing the plurality of vane preforms comprises providing at least one hollow vane preform, and
   wherein the hollow vane preform comprises pre-cured carbon rods in a central core.

* * * * *